United States Patent [19]

Hamel

[11] Patent Number: 5,024,402
[45] Date of Patent: Jun. 18, 1991

[54] CORD RESTRAINT

[76] Inventor: Leo F. Hamel, 11103 Moreno Ave., Lakeside, Calif. 92040

[21] Appl. No.: 524,336

[22] Filed: May 15, 1990

Related U.S. Application Data

[63] Continuation of Ser. No. 464,997, Jan. 16, 1990, abandoned, which is a continuation of Ser. No. 370,172, Jun. 20, 1989, abandoned, which is a continuation of Ser. No. 800,894, Nov. 21, 1985, abandoned, which is a continuation of Ser. No. 546,978, Oct. 31, 1983, abandoned.

[51] Int. Cl.$^5$ .............................................. F16L 3/00
[52] U.S. Cl. ..................................... 248/52; 24/16 PB
[58] Field of Search ............ 24/16 R, 16 PB, 30.5 P, 24/129 B, 288, 305, 298, 300, 301, 302, 326, 335, 336, 339, 488, 563, 30.55; 248/74.3, 52, 74.2, 113, 316.3; 224/249-251; 439/369, 502

[56] References Cited

U.S. PATENT DOCUMENTS

| | | | |
|---|---|---|---|
| 1,545,017 | 7/1925 | Smith | 248/52 |
| 2,204,939 | 6/1940 | Lyons . | |
| 2,257,559 | 9/1941 | Albertson . | |
| 2,292,140 | 8/1942 | Lofgren . | |
| 2,350,048 | 5/1944 | Kohler et al. . | |
| 2,721,711 | 10/1955 | Torzewski . | |
| 2,893,045 | 7/1959 | Dalbec . | |
| 2,894,119 | 7/1959 | Stenger | 224/249 X |
| 3,066,665 | 12/1962 | Reilly . | |
| 3,141,359 | 7/1964 | Bennett et al. | 248/52 X |
| 3,273,213 | 9/1966 | Zurkowski | 24/298 |
| 3,369,723 | 2/1968 | Saari et al. | 224/250 X |
| 3,725,848 | 4/1973 | Davidson . | |
| 4,112,988 | 9/1978 | Nelson | 24/16 PB X |
| 4,182,005 | 1/1980 | Harrington . | |
| 4,227,668 | 10/1980 | Ernst | 24/16 PB X |
| 4,229,924 | 10/1980 | Teachout, Sr. | 24/16 PB X |

FOREIGN PATENT DOCUMENTS

| | | | |
|---|---|---|---|
| 1277974 | 9/1968 | Fed. Rep. of Germany | 24/339 |
| 560916 | 4/1959 | Italy | 24/339 |
| 667640 | 9/1964 | Italy | 24/16 PB |
| 381603 | 10/1964 | Switzerland | 24/16 PB |
| 386327 | 4/1965 | Switzerland | 24/16 PB |

Primary Examiner—James R. Brittain
Attorney, Agent, or Firm—Stetina and Brunda

[57] ABSTRACT

An improved cord restraint device is disclosed characterized by use of an elongate strap formed of an elastomeric material such as rubber capable of being readily stretched. Three apertures are formed in the strap with a slot extending between a pair of the apertures located adjacent one end. In operation, the strap is positioned about one end of the cord by insertion of the end of the cord through the single aperture which maintains the strap permanently upon the cord. The cord may then be coiled about the appliance, and the strap may subsequently be stretched such that the elongate slot is inserted over the end of the appliance to maintain the cord wrapped thereabout. The cord can be immediately removed from the appliance merely by restretching the strap such that the slot can be subsequently removed from engagement with the end of the appliance.

7 Claims, 1 Drawing Sheet

U.S. Patent    June 18, 1991    5,024,402
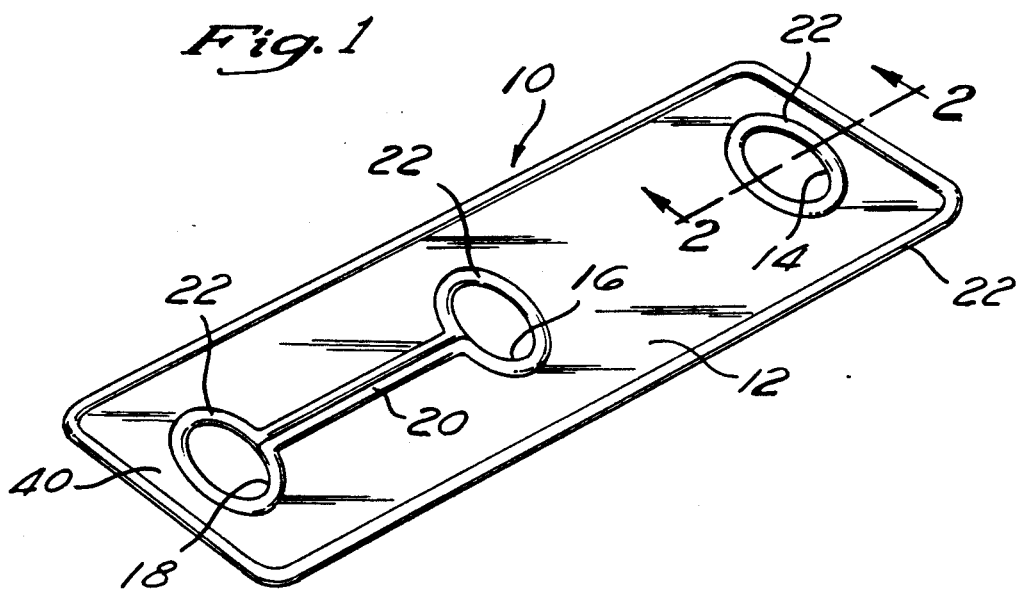
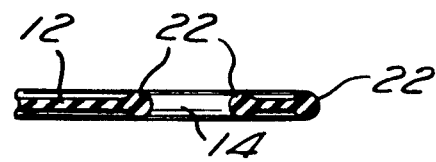
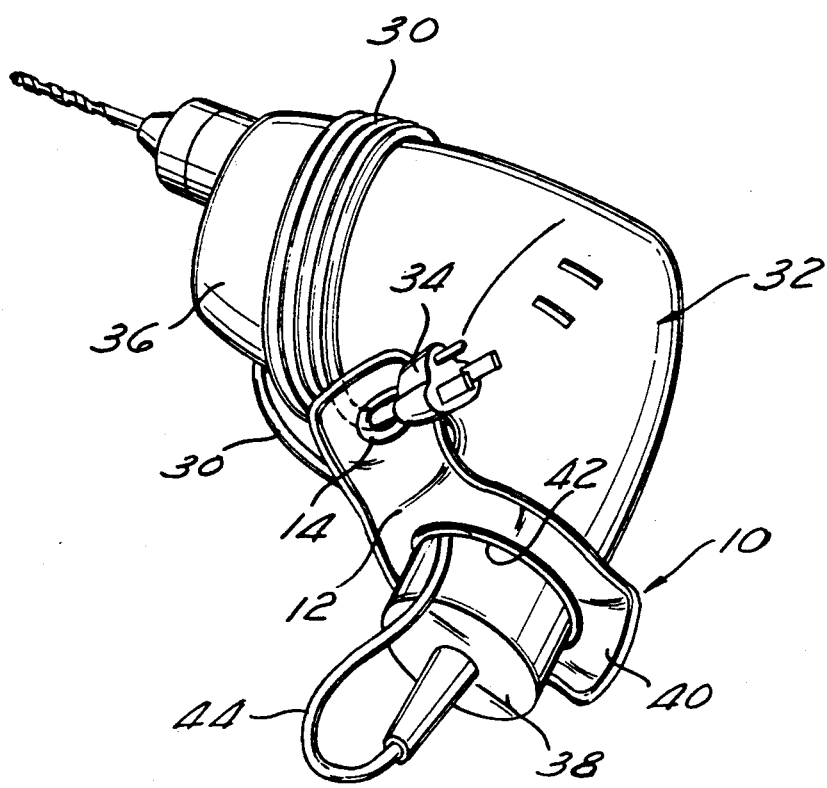

CORD RESTRAINT

This application is a continuation of application Ser. No. 07/464,997, filed Jan. 16, 1990, now abandoned, which is continuation of Ser. No. 07/370,172, 6/20/89, now abandoned, which is a continuation of Ser. No. 06/800,894, Nov. 21, 1985, now abandoned, which is a continuation of Ser. No. 06/546,978, Oct. 31, 1983, now abandoned.

BACKGROUND OF THE INVENTION

The present invention relates generally to apparatus for holding an electric cord and the like in a stowed configuration and, more particularly, to an improved cord restraint device adapted to rapidly secure and retain a cord in a coiled configuration about an appliance.

The organized storage of elongate members such as electric appliance cords, electric extension cords, hoses, ropes, and the like, has continuously been troublesome with most individuals attempting to coil such cords and subsequently retain the same in their coiled orientation by way of wrapping a length of wire about the coil or tying the cord in a knot about itself. As is all too well known, such wire wrapping and knotting techiques typically prove awkward to initially accomplish while additionally causing substantial difficulty in effectuating the uncoiling of the cord for subsequent use.

Although these deficiencies have been recognized to a limited extent in the art, the proposed solutions to date have either comprised various structures such as hooks or the like attached to the appliance about which the cord may be wound or various molded retaining attachments to the male plug end of the cord adapted to releasably grip a portion of the coiled cord length. Examples of such prior art are shown in U.S. Pat. No. 2,204,939 issued to Lyons, U.S. Pat. No. 2,292,140 issued to Lofgren, U.S. Pat. No. 2,350,048 issued to Kobler, et al., U.S. Pat. No. 2,721,711 issued to Torzewski, U.S. Pat. No. 2,893,045 issued to Dalbek, and U.S. Pat. No. 3,725,848 issued to Davidson.

Such exemplary prior art solutions, although comprising an improvement to the simplistic wire wrapping and/or knotting techniques, typically prove awkward in use, fail to securely hold the cord in place through prolong use or handling, and usually must be designed into the original manufacture of the appliance thereby substantially increasing costs of the appliance to the ultimate consumer.

As such, there exists a substantial need in the art for an improved cord restraint device that is relatively inexpensive, can be easily manipulated to securely maintain a cord or the like in a stowed configuration for prolong duration, and can be retrofitted to service existing appliances.

SUMMARY OF THE PRESENT INVENTION

The present invention specifically addresses and alleviates the above-referenced need associated in the art by providing an improved cord restraint fabricated as an elongate, generally planar strap preferably formed of an elastomeric, readily stretchable, material such as rubber. Three apertures are formed in the strap with an elongate slot extending between a pair of the apertures located adjacent one end of the strap. To retain the cord of an appliance or the like in a stowed configuration, the elongate strap is positioned about the male plug end of the cord of the of the electrical appliance by insertion of the male plug through the single, aperture in the strap which thereby maintains a strap upon the electrical cord of the appliance. The cord is then coiled about the appliance and the elongate strap may subsequently be stretched such that the elongate slot is inserted over the end of the appliance to maintain the cord wrapped thereabout. The cord can be immediately removed from the appliance merely by restretching the strap such that the elongate slot can be disengaged from the end of the appliance.

In the preferred embodiment, the elongate strap may be fabricated utilizing either stamping or molding techniques at relatively low cost and due to its internal resiliency may easily accommodate nearly all electrical appliances, hoses, and the like. In addition, due to the strap member being retained about the cord or hose of the appliance, the cord restraint device of the present invention is not subject to loss and is at the immediate disposal of an individual for reuse on the appliance. Further, due to the internal resiliency of the elongate strap, the device positively and securely retains the cord in a coiled stowed configuration about an appliance for prolong duration and throughout continued handling.

DESCRIPTION OF THE DRAWINGS

These as well as other features of the present invention will become more apparent upon references to the drawings, wherein:

FIG. 1 is a perspective view of the improved cord restraint device of the present invention;

FIG. 2 is a cross-sectional view taken about lines 2—2 of FIG. 1; and

FIG. 3 is a perspective view of the cord restraint device utilized to maintain an electrical cord about an electric appliance.

DETAILED DESCRIPTION OF THE PREFERRED EMBODIMENT

Referring to FIG. 1, there is shown the improved cord restraint device 10 of the present invention which comprises an elongate, generally planar strap 12 preferably formed of a readily stretchable elastomeric material such as rubber. Not by way of limitation, in the preferred embodiment, the length of the strap member 12 may be varied between approximately 4 and 10 inches in length depending upon the particular restraint application desired. The elongate strap 12 typically is formed having a generally uniform planer thickness of approximately 1/16ths to ⅛th of an inch and includes three apertures 14, 16, and 18 arranged in a coaxial orientation.

As shown in FIG. 1, the aperture 14 is positioned adjacent one end of the strap 12 while the pair of apertures 16 and 18 are positioned adjacent the opposite end and are interconnected by an elongate slot 20 extending through the strap 12. In those instances where the strap 12 is fabricated by molding techiques, the perimeter of the strap 12, circumference of the apertures 14, 16, and 18, and length of the elongate slot 20 are preferably provided with a reinforcement rib 22 which reduces the possibility of tearing of the strap during manual stretching. However, it will be recognized that when the strap 12 is formed by stamping techniques, such reinforcement ribs 22 will not be present.

With the structure defined, the operation of the improved cord restraint 10 of the present invention may be described. For purposes of illustration only, the cord restraint 10 is depicted restraining an electrical cord 30 of an electrical appliance 32 such as a hand-held drill motor. However, those skilled in the art will recognize that the improved cord restraint device 10 may be utilized to retain other elongate members such as electrical extension cords, air hoses, water hoses, ropes and the like; and for purposes of this application, the term "cord" and/or "electric cord" shall be defined to include all such elongate members.

Initially, the elongate strap 12 is positioned about the male plug end 34 of the cord 30 by insertion of the plug end 34 through the aperture 14 formed in the strap 12. As will be recognized, the aperture 14, although having a diameter less than the effective diameter of the plug end 34, may be inserted over the plug end 34 by manually stretching the aperture 14 and sliding the same over the plug end 34. Once inserted over the plug end, the internal resiliency of the strap member 12 causes the aperture 14 to reduce in size back to its initially unstretched dimensions and thereby retain the strap 12 upon a cord 30.

The length of the electric cord 30 may then be tightly wound or coiled about the body portion 36 of the appliance 32. To retain the cord 30 in this coiled configuration, the user subsequently grasps the distal portion 40 of the elongate strap 12 to axially stretch the strap member 12 through a distance sufficient to align the elongate slot 20 extending between the apertures 16 and 18 with the handle portion 38 of the appliance 32. Aligned in this manner, the strap 12 may be pushed toward the handle end 38 with the elongate slot 20 and aperture 26 and 18 forming an enlarged opening or composite aperture 42 sufficient in size to extend over the handle portion 38 of the appliance 32 as well as the fixed end portion 44 of the electrical cord 30. Due to the internal resiliency of the strap 12, the elongate slot 20 and aperture 16 and 18 tightly conform to the configuration of the handle portion 38 to retain the cord 30 in its coiled configuration about the appliance 32. As will be recognized, positioned in such a manner, the plug end 34 as well as fixed end 44 of the electrical cord 30 is continously maintained in tension and held tightly against the appliance 32 by the internal resiliency of the strap 12. Thus, both ends of the cord 30 are positively restrained or captured such that they will not work loose during prolong use or storage.

When it is desired to use the appliance 32, a user need only grip the distal portion 40 of the strap 12 and again apply an axial stretching force to the strap member 12 which enlarges the effective opening 42 of the elongate slot 20 and apertures 16 and 18 such that the strap 12 may be reciprocated outward and disengaged from the handle portion 38 of the appliance 32. Subsequently, the cord 30 may be uncoiled from the appliance 32 with the strap 12 being retained on the plug end 34 portion of the cord so as not to become lost during use of the appliance 32. Although for purposes of illustration the strap 12 has been described in use with an appliance 32, it will be recognized that the apertures 16 and 18 and slot 20 can additionally be extended directly about the actual coil of the cord 30 rather than the handle portion of an appliance such that the device 10 retains any coil of elongate members together.

Thus, in summary, the present invention provides a substantially improved cord restraint device which is easy to use, economical, provides positive restraint of the cord for prolong duration, and is capable of being retrofitted onto existing appliances. Although in the preferred embodiment certain materials and configurations have been defined, those skilled in the art will recognize that modificaitons to the same can be made without departing from the spirit of the present invention and such modifications are contemplated herein.

What is claimed is:

1. The combination of an electrical appliance and a device for retaining an electrical cord in a stowed configuration upon the appliance comprising:

an electrical appliance having a handle portion and an electrical cord extending outwardly from said handle portion;

an elongate strap having a first end and a second end;

a first aperture formed adjacent said first end of said strap having an inner diameter sized to permit said first aperture to be resiliently stretched to extend over a plug end of said cord and be retained at desired axial positions along the length of said cord; and a second aperture, larger than said first aperture, formed adjacent the second end of said strap and defining an enlarged opening sufficient in size to be extended over said handle portion of the appliance;

said strap formed of a sufficiently resilient, readily stretchable material to permit said strap to be initially, axially stretched so that said second aperture may be positioned over said handle portion of the appliance and capture the cord against the handle portion and subsequently be maintained in tension resulting solely from the internal resiliency of the strap to return towards its original non-stretched configuration to tightly secure the cord against the appliance.

2. The combination of claim 1 wherein said second aperture comprises a pair of apertures interconnected by an elongate slot.

3. The combination of claim 2 further comprising a reinforcement rib extending about said first aperture, said pair of apertures and said elongate slot.

4. The combination of claim 3 further comprising a reinforcement rib extending about the perimeter of said strap.

5. The combination of claim 4 wherein said strap is formed of an elastomeric material.

6. The combination of claim 5 wherein said elastomeric material is rubber.

7. A method of retaining a cord of an appliance in a stowed configuration upon the appliance comprising the steps of:

forming an elongate strap having a first end and a second end wherein a first aperture is formed adjacent the first end of the strap having an inner diameter sized to permit the first aperture to be resiliently stretched to extend over a plug end of the cord and be retained at desired axial positions along the length thereof, and a second aperture, larger than the first aperture, is formed adjacent a second end of the strap and defines an enlarged opening sufficient in size to be extended over a handle portion of the appliance;

placing the plug end of the cord through the first aperture; and extending the second aperture over the handle portion of the appliance.

* * * * *